United States Patent
Holderle et al.

(10) Patent No.: US 8,292,500 B1
(45) Date of Patent: Oct. 23, 2012

(54) IR SENSOR FOR ELECTRONIC THERMOMETER

(75) Inventors: Eric B. Holderle, St. Loius, MO (US); Thomas G. Lewis, O'Fallon, IL (US)

(73) Assignee: Tyco Healthcare Group LP, Mansfield, MA (US)

( * ) Notice: Subject to any disclaimer, the term of this patent is extended or adjusted under 35 U.S.C. 154(b) by 0 days.

(21) Appl. No.: 13/249,636

(22) Filed: Sep. 30, 2011

(51) Int. Cl.
*G01J 5/00* (2006.01)
(52) U.S. Cl. .................................................. 374/121
(58) Field of Classification Search ............... 374/121
See application file for complete search history.

(56) References Cited

U.S. PATENT DOCUMENTS

| | | | |
|---|---|---|---|
| 3,905,232 A | 9/1975 | Knute | |
| 4,341,992 A | 7/1982 | Goldstein | |
| 4,900,162 A * | 2/1990 | Beckman et al. | 374/132 |
| 5,066,142 A | 11/1991 | DeFrank et al. | |
| 5,167,235 A | 12/1992 | Seacord et al. | |
| 5,411,032 A | 5/1995 | Esseff et al. | |
| 5,487,607 A | 1/1996 | Makita et al. | |
| 6,001,066 A | 12/1999 | Canfield et al. | |
| 6,149,297 A | 11/2000 | Beerwerth et al. | |
| 6,186,959 B1 | 2/2001 | Canfield et al. | |
| 6,195,581 B1 | 2/2001 | Beerwerth et al. | |
| 6,522,912 B1 * | 2/2003 | Nakatani et al. | 600/474 |
| 6,584,426 B2 | 6/2003 | Ota | |
| 6,612,735 B2 | 9/2003 | Tomioka et al. | |
| 6,694,174 B2 | 2/2004 | Kraus et al. | |
| 6,742,927 B2 | 6/2004 | Bellifemine | |
| 7,036,978 B2 | 5/2006 | Tabata et al. | |
| 7,314,310 B2 | 1/2008 | Medero | |
| 7,355,178 B2 * | 4/2008 | Everest | 250/338.1 |
| 7,536,568 B2 | 5/2009 | Price et al. | |
| 7,572,056 B2 | 8/2009 | Lane et al. | |
| 7,813,889 B2 | 10/2010 | Quinn et al. | |
| 7,815,367 B2 | 10/2010 | Lane et al. | |
| 2006/0078037 A1 * | 4/2006 | Lee et al. | 374/170 |
| 2006/0098710 A1 * | 5/2006 | Kienitz | 374/142 |
| 2009/0105605 A1 * | 4/2009 | Abreu | 600/549 |
| 2009/0289698 A1 | 11/2009 | Price et al. | |
| 2010/0017163 A1 | 1/2010 | Yamaguchi et al. | |
| 2010/0284436 A1 * | 11/2010 | Lane et al. | 374/121 |
| 2010/0322282 A1 * | 12/2010 | Lane et al. | 374/121 |
| 2011/0134962 A1 * | 6/2011 | Fraden | 374/209 |
| 2011/0257521 A1 * | 10/2011 | Fraden | 600/438 |

FOREIGN PATENT DOCUMENTS

| | | |
|---|---|---|
| DE | 19600334 A1 | 7/1997 |
| JP | 2000131146 A | 5/2000 |
| JP | 2000217788 A | 8/2000 |

* cited by examiner

*Primary Examiner* — Lisa Caputo
*Assistant Examiner* — Jamel Williams
(74) *Attorney, Agent, or Firm* — Lisa E. Winsor, Esq.

(57) ABSTRACT

An electronic thermometer includes a probe adapted to be heated by a subject for use in measuring a temperature of the subject. At least one temperature sensor detects a temperature of the probe. An IR emitter emits an infrared signal from the probe. And an IR detector detects the infrared signal emitted by the IR emitter. The detection of the IR signal by the IR detector indicates that the probe is received in a probe cover.

25 Claims, 11 Drawing Sheets

FIG. 11

IR SENSOR FOR ELECTRONIC THERMOMETER

BACKGROUND

The present invention generally relates to thermometers, and more particularly to a thermometer having an IR probe sensor.

Medical thermometers are typically employed to measure a subject's body temperature to facilitate the prevention, diagnosis, and treatment of diseases, body ailments, etc., for humans and other animals. An accurate reading of a subject's body temperature is required for effective use and should be taken from the internal or core temperature of a subject's body. Several thermometer devices are known for measuring a subject's body temperature, such as, for example, electronic thermometers, including tympanic thermometers.

Tympanic thermometers have a sensing probe that is inserted into a subject's cavity (e.g., ear) for measuring the subject's body temperature. Before inserting the sensing probe into the subject's cavity, a probe cover is preferably mounted onto the sensing probe to provide a sanitary barrier between the sensing probe and the subject. The probe cover is typically discarded after the subject's body temperature has been obtained.

In the case of a tympanic thermometer, the sensing probe includes a heat sensor such as a thermopile for sensing infrared emission from the tympanic membrane, or eardrum. During use, the thermopile is generally located inside the ear canal. The thermopile utilizes a waveguide of radiant heat to transfer heat energy from the eardrum to the sensor.

Often times during use, the thermometer probe is inadvertently placed into a subject's cavity without a probe cover. This exposes the thermometer to cross contamination, which compromises the ability of the thermometer to generate accurate reading and necessitates cleaning the probe. A conventional thermometer cannot detect the placement of the probe in the subject's cavity. Therefore, a need exists for a thermometer that can better promote proper usage of the thermometer, including the placement of the probe.

SUMMARY

In one aspect, an electronic thermometer generally comprises a probe adapted to be heated by a subject for use in measuring a temperature of the subject. At least one temperature sensor detects a temperature of the probe. An IR emitter emits an infrared signal from the probe. And an IR detector detects the infrared signal emitted by the IR emitter. The detection of the IR signal by the IR detector indicates that the probe is received in a probe cover.

In another aspect, a method of determining a temperature of a subject with an electronic thermometer generally comprises emitting an IR signal out of a probe with an IR emitter. Detecting the IR signal emitted by the IR emitter with an IR detector. The detection of the IR signal by the IR detector indicating that the probe is received in a probe cover. And detecting a temperature of the probe when inserted into the subject by using a temperature sensor to determine the temperature of the subject.

Other objects and features will be in part apparent and in part pointed out hereinafter.

DETAILED DESCRIPTION

The exemplary embodiments of the tympanic thermometer and methods of use disclosed are discussed in terms of medical thermometers for measuring body temperature and, more particularly, in terms of a tympanic thermometer that includes a temperature sensor for measuring body temperature when the thermometer is inserted into an ear of a subject. However, the disclosed elements can be used with other types of electronic thermometers (ex., oral and rectal thermometer) without departing from the scope of the present invention.

Figure 2:
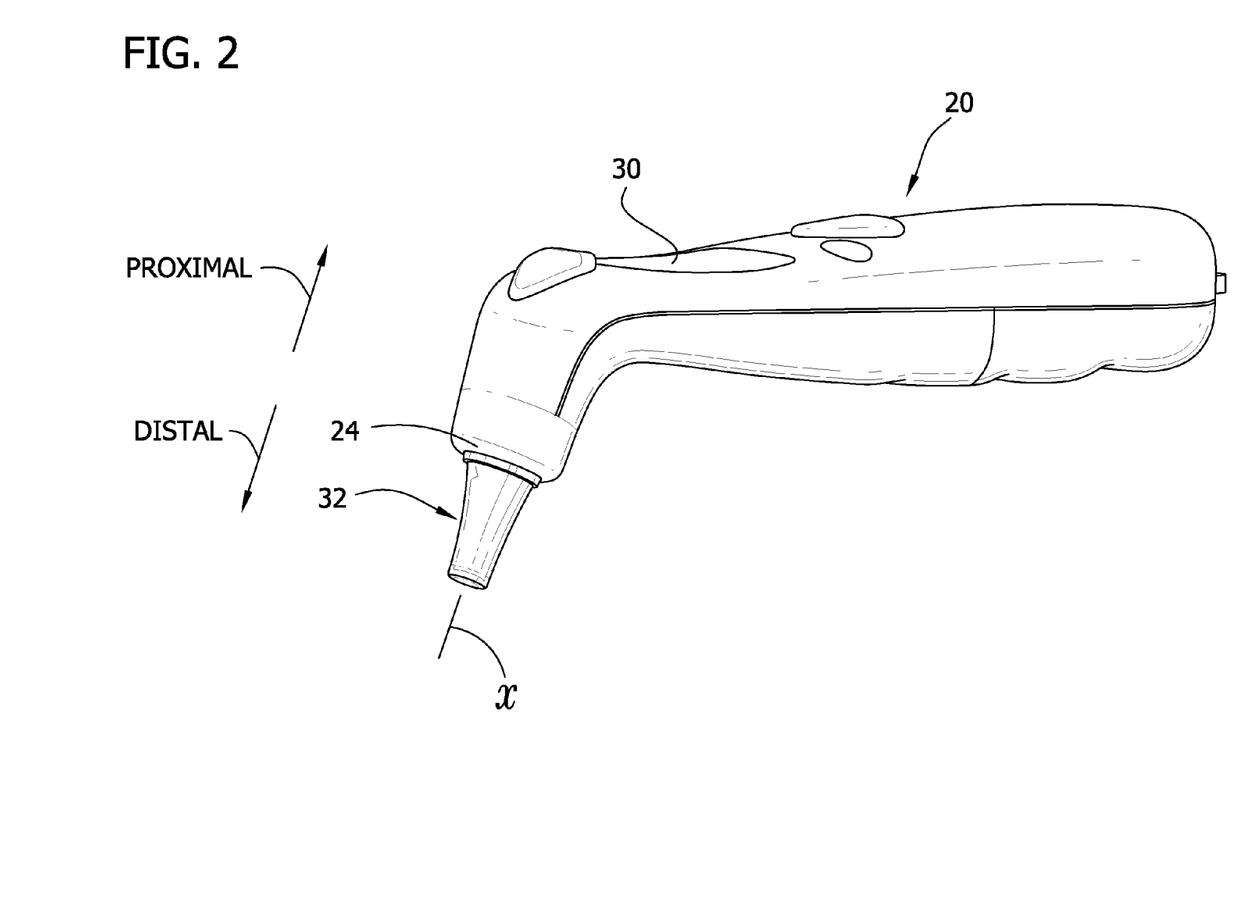
FIG. 2 is a perspective view of the tympanic thermometer shown in FIG. 1 with a probe cover disposed on a distal end of the thermometer.
Figure 3:
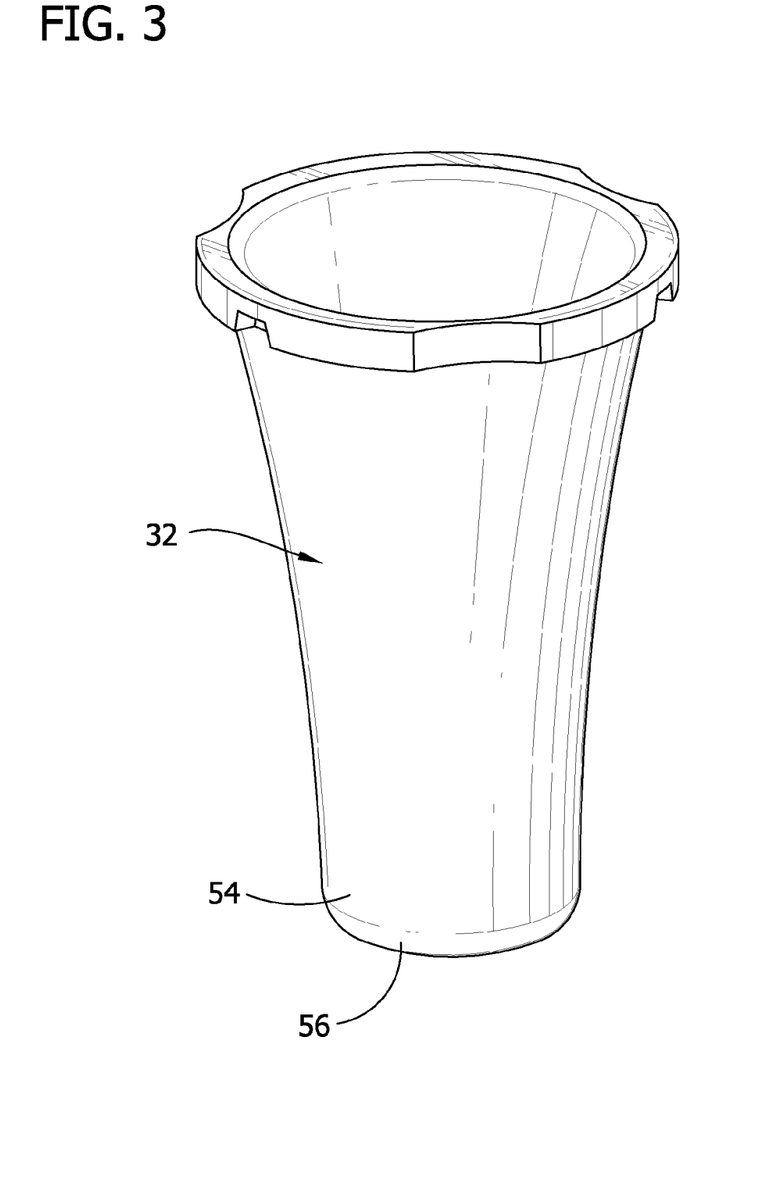
FIG. 3 is a perspective view of the probe cover shown in FIG. 2.

In the discussion that follows, the term "proximal" will refer to the portion of a structure that is closer to a practitioner, while the term "distal" will refer to the portion that is farther from the practitioner. FIG. 2 illustrates "proximal" and "distal" for the structure, which is the fully assembled and usable tympanic thermometer. As-used herein, the term "subject" refers to a human patient or other animal having its body temperature measured. According to the present disclosure, the term "practitioner" refers to a doctor, nurse, parent or other care provider utilizing a tympanic thermometer to measure a subject's body temperature, and may include support personnel.

Figure 1:
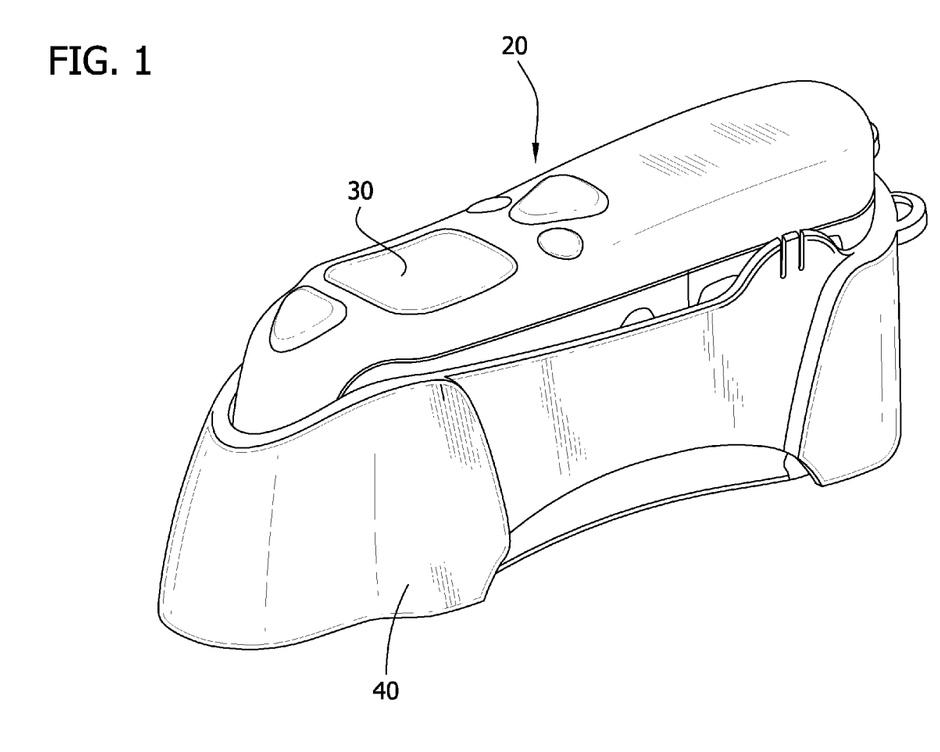
FIG. 1 is a perspective view of a tympanic thermometer, in accordance with the principles of the present disclosure, mounted on a holder.

Reference will now be made in detail to exemplary embodiments of the present disclosure, which are illustrated in the accompanying Figures. Turning now to the Figures and initially to FIGS. 1 and 2, there is illustrated a tympanic thermometer, generally indicated at 20, in accordance with the principles of the present disclosure. It is contemplated that the tympanic thermometer 20 includes the necessary electronics and/or processing components to perform temperature measurement via the tympanic membrane, as is known to one skilled in the art. It is further envisioned that tympanic thermometer 20 may include a waveguide to facilitate sensing of the tympanic membrane heat energy. However, in the illustrated embodiments, the waveguide is beneficially omitted. The tympanic thermometer 20 is releasably mounted in a holder 40 for storage in contemplation for use. The tympanic thermometer 20 and holder 40 may be fabricated from semi-rigid, rigid plastic and/or metal materials suitable for temperature measurement and related use. It is envisioned that the holder 40 may include the electronics necessary to facilitate powering the tympanic thermometer 20, including, for example, battery charging capability, etc. The thermometer 20 is operable in a sleep mode wherein the thermometer 20 conserves energy and is not capable of performing a temperature measurement and an awake mode wherein the thermometer is operating at full power and is capable of performing a temperature measurement in certain conditions as will be described in greater detail below.

Referring to FIGS. 2-5, tympanic thermometer 20 includes a cylindrical heat sensing probe, generally indicated at 22. The heat sensing probe 22 extends from a distal end 24 of tympanic thermometer 20 and defines a longitudinal axis X. The heat sensing probe 22 may have various geometric cross-sectional configurations, such as, for example, rectangular, elliptical, etc.

A probe cover 32 may be disposed over the heat sensing probe 22. The probe cover 32 has a distal end 54 that is substantially enclosed by a film 56. The film is substantially transparent to infrared radiation and configured to facilitate sensing of infrared emissions by heat sensing probe 22. The film 56 is advantageously impervious to ear wax, moisture and bacteria to prevent disease propagation. One skilled in the art, however, will realize that other materials and fabrication methods suitable for assembly and manufacture are also within the scope of the present invention.

Figure 4:
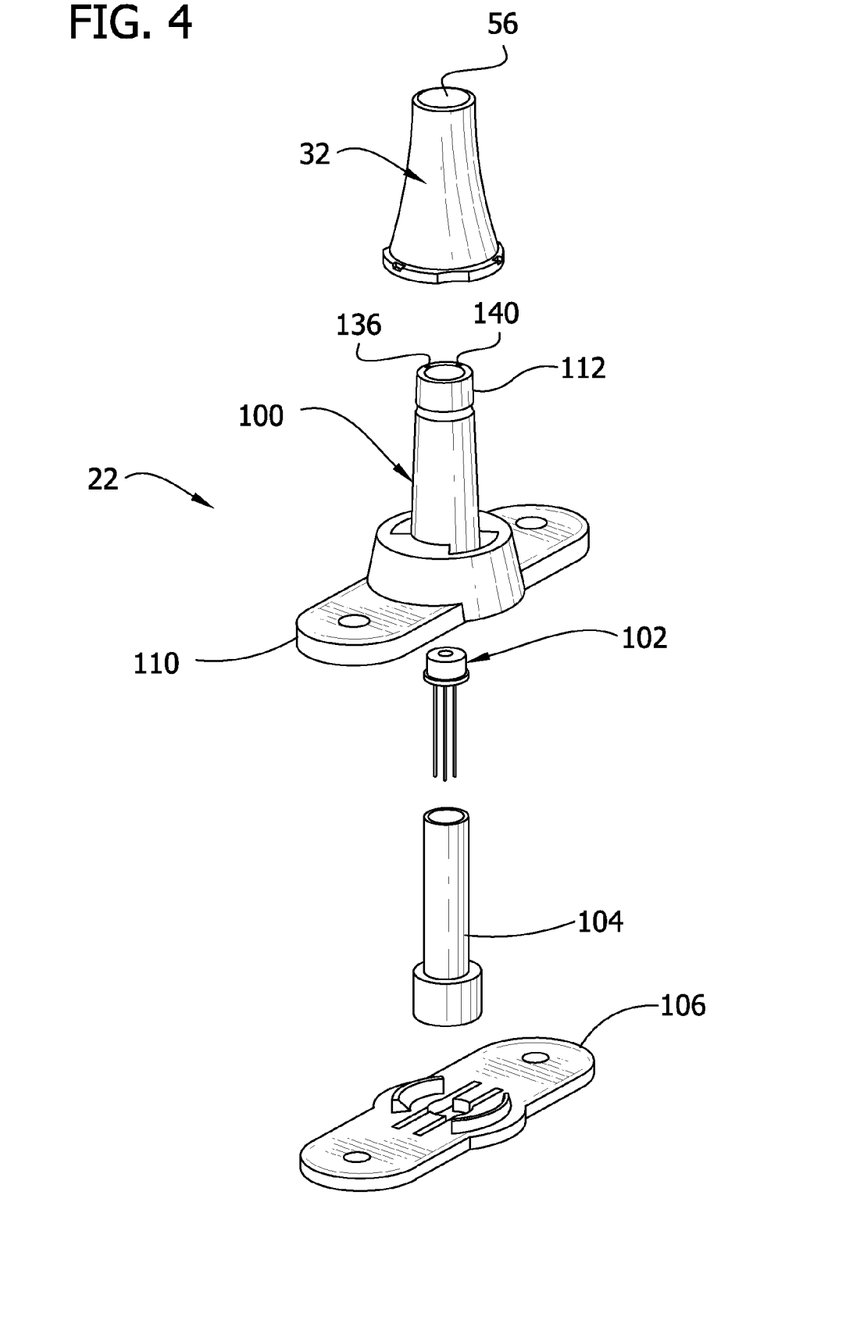
FIG. 4 is an exploded perspective view of the distal end of the tympanic thermometer shown in FIG. 2.
Figure 5:
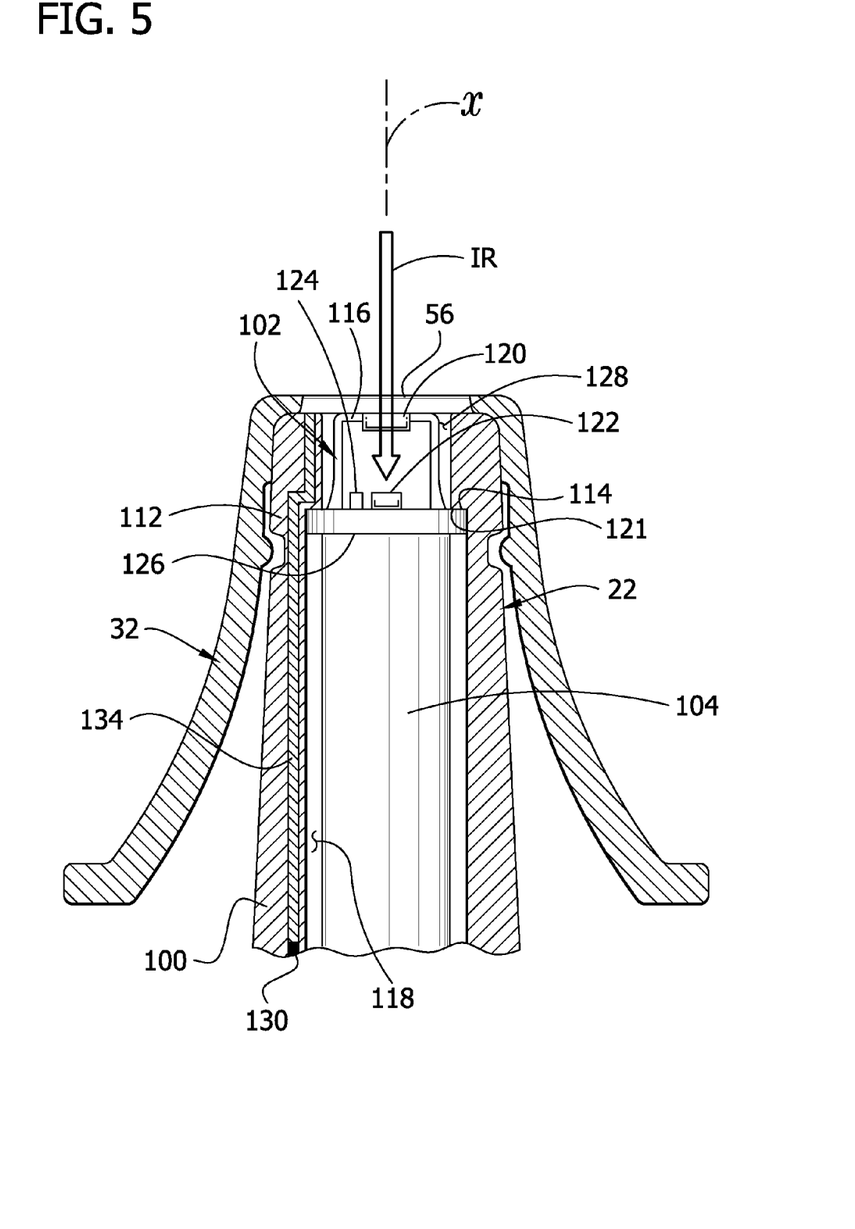
FIG. 5 is a cross-sectional and fragmentary view of the probe cover mounted on the distal end of the tympanic thermometer taken through line 5-5 of FIG. 6.
Figure 6:
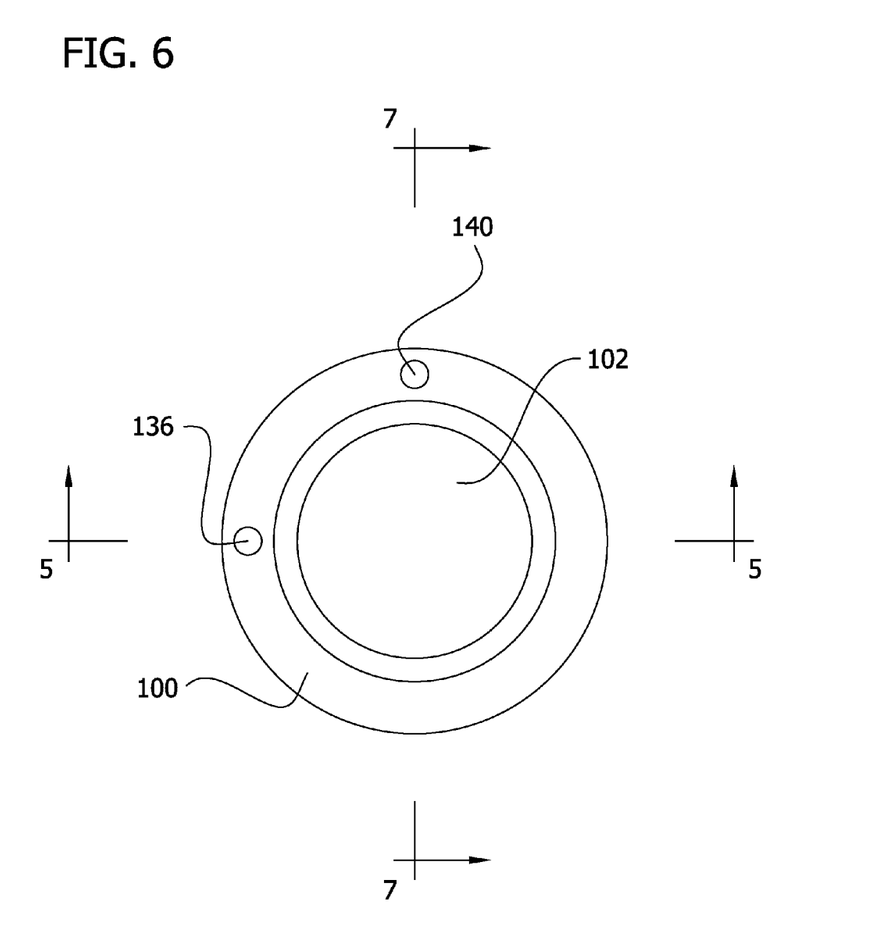
FIG. 6 is an end view of the distal end of the tympanic thermometer.
Figure 7:
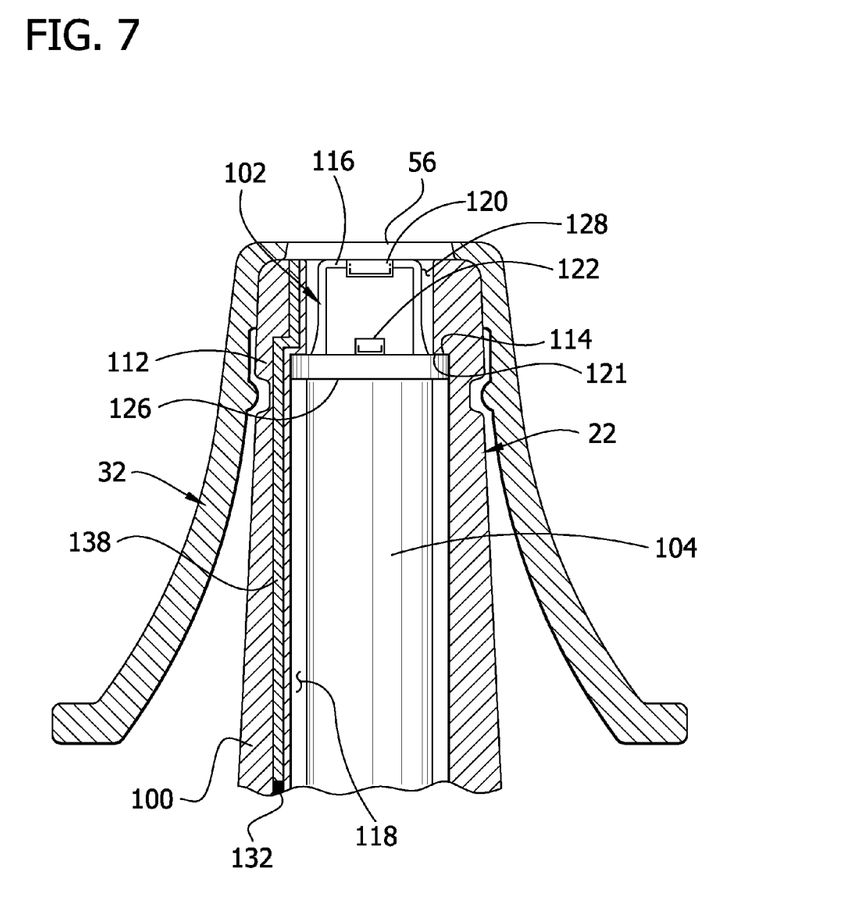
FIG. 7 is a cross-sectional and fragmentary view taken through line 7-7 of FIG. 6 showing the probe cover mounted on the distal end of the tympanic thermometer.

Referring to FIGS. 4 and 5, the heat sensing probe 22 includes a nozzle, generally indicated at 100, mounted on a base 106. The nozzle 100 includes a base 110 and an elongated nose portion 112 projecting distally from the base. By way of non-limiting example, nozzle 100 may be fabricated from metal or other material which aides in the rapid exchange or transfer of heat. The nozzle 100 is formed of two parts (the base 110 and the nose portion 112) in the illustrated embodiment. It will be understood that a nozzle can be formed as one piece or more than two pieces without departing from the scope of the present invention. In particular, it is envisioned that the elongated nose section 112 can be formed of two or more pieces.

Figure 8:
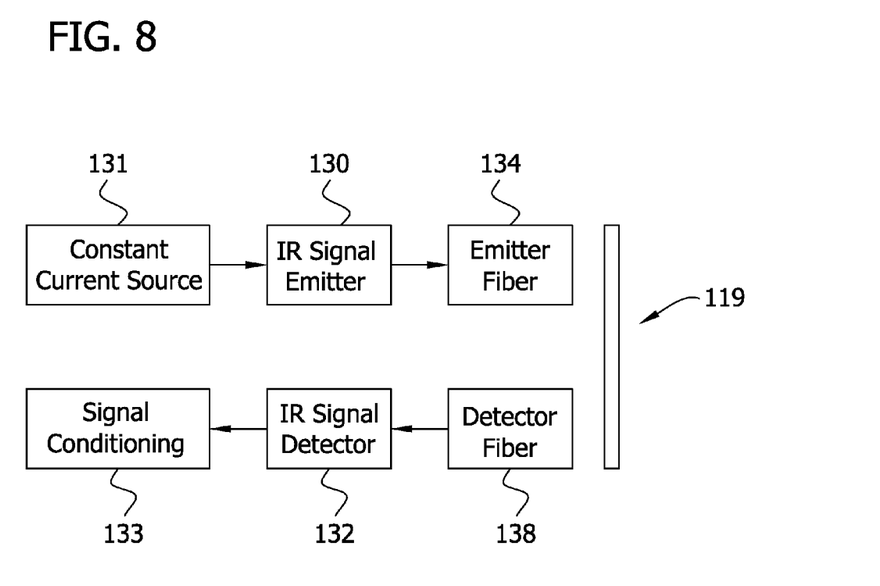
FIG. 8 is a block diagram of an IR system of the tympanic thermometer.

The heat sensing probe 22 also includes a sensor can, generally indicated at 102, attached to temperature sensing electronics mounted on a distal end of a sensor housing 104 (or "retainer") received within the nozzle 100. The can 102 includes a sensor base 126 and a generally inverted cup-shaped tip 116 mounted on the base. A temperature sensor 122 (e.g., a thermopile), an infrared filter or window 120 and thermistor 124 are housed within can 102. The sensor housing 104 is mounted on the base 106 of probe 22 such that it extends generally coaxially within nozzle 100. By way of non-limiting example, the sensor housing 104 is fabricated from materials that provide for less thermo transmission (i.e., more insulated) than the nozzle 100, for example, plastic or other similar matter. So the material of the sensor housing 104 has a low thermal conductivity as compared to the thermal conductivity of the nozzle 100 and the base 126 of the can 102. The probe may also include a probe cover film 119 (FIG. 8).

The probe cover 32 is received on the nozzle 100 such that a distal portion of the cover is in thermal contact with the nose 112 of the nozzle. Probe cover 32 may be shaped, for example, frustoconically, or shaped in a tapered manner as to allow for easier insertion into the ear of the subject and attachment and detachment from the heat sensing probe 22. The probe cover 32, which is disposable, may be fabricated from materials suitable for measuring body temperature via the tympanic membrane with a tympanic thermometer measuring apparatus. These materials may include, for example, plastic materials, such as, for example, polypropylene, polyethylene, etc., depending on the particular temperature measurement application and/or preference of a practitioner.

In operation, infrared energy IR (FIG. 5) from the subject's tympanic membrane, for example, passes through the film 56 of probe cover 32 and enters can 102 through the window 120 of probe 22. This infrared energy may heat the can 102 and create a temperature gradient across the tip 116 from its distal end to its proximal end contacting the base 126. That is, the distal end can be much warmer than the proximal end. Heat from, for example, the ear of the subject is transferred from probe cover 32 to nozzle 100 to the base 126 of the can 102 via a path of heat flux (not shown). The path of heat flux heats the can 102 in order to reduce the temperature gradient across tip 116, thereby enabling a faster and more accurate temperature reading. An internal ridge 121 engages a distal side of a peripheral edge margin 114 of the base 126 to provide a heat conducting path from the nozzle 100 to the base 126 defining the path of heat flux. It is contemplated herein that nozzle 100 may be both in physical contact with the peripheral edge margin 114 or in a close proximate relationship with peripheral edge margin 114 of can 102. In either case, there should be such thermal contact as to enable heat transfer from the internal ridge 121 of the nozzle 100 to the peripheral edge margin 114 of the base 126.

Referring to FIGS. 5-8, an IR signal emitter 130 and an IR signal detector 132 are disposed in a wall of the nozzle 100 at a proximal end of the nozzle. The IR signal emitter 130 is configured to emit an infrared signal and the IR signal detector 132 is configured to detect the infrared signal emitted by the IR signal emitter when the probe 22 is received in the probe cover 32. In one embodiment, the IR emitter emits an infrared signal within about a 940 nm wavelength range and the IR detector 132 generates a voltage level that is proportional to the strength of the infrared signal detected by the IR detector. A constant current source 131 provides electric current to the IR signal emitter 130. And, in one embodiment, a signal conditioner 133 conditions the voltage signal produced by the IR signal detector 132 to condition the signal into a suitable form to be processed by a controller (not shown) of the thermometer 20. The constant current source 131, IR signal emitter 130, IR signal detector, and signal conditioner 133 comprise an IR system.

An emitter fiber 134 extends within the wall of the nozzle 100 along a length of the nozzle from the IR emitter 130 at the proximal end of the nozzle to a distal end of the nozzle.

In one embodiment, the emitter fiber 134 comprises fiber optic strands for conducting an infrared signal. The emitter fiber 134 terminates at an emitter opening 136 in the distal end of the nozzle 100 so that the emitted infrared signal is conducted out of the distal end of the nozzle.

A detector fiber 138 extends within the wall of the nozzle 100 along the length of the nozzle from the IR detector 132 at the proximal end of the nozzle to the distal end of the nozzle. The detector fiber 138 also comprises, for example, fiber optic strands for conducting an infrared signal. The detector fiber 138 terminates at a detector opening 140 in the distal end of the nozzle 100 so that the emitted infrared signal from the IR emitter 130 can be conducted to the IR detector 132 when the probe 22 is received in the probe cover 32. In particular, the film 56 of the probe cover 32 reflects the infrared signal emitted by the IR emitter 130 into the detector opening 140 and to the detector fiber 138 so that the infrared signal can be conducted to the IR detector 132.

Figure 9:
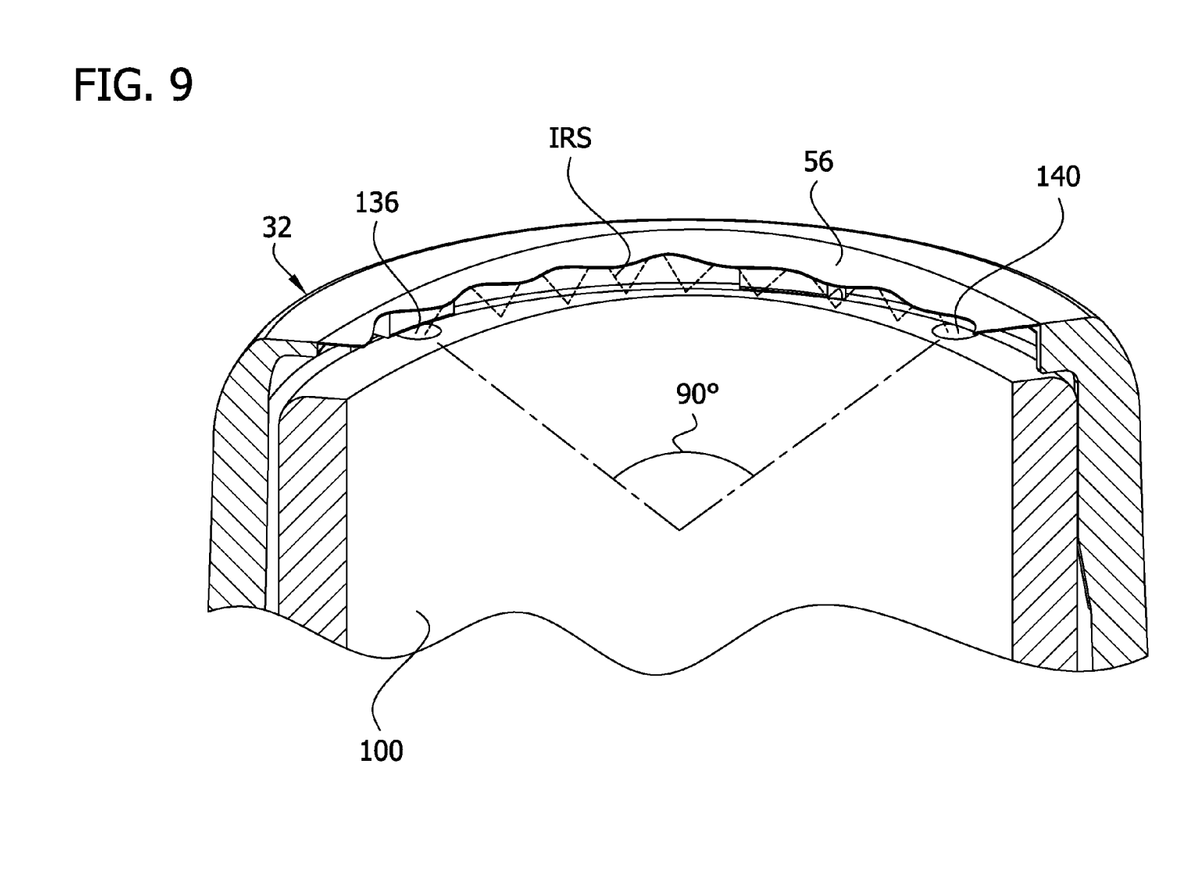
FIG. 9 is an enlarged perspective view of the probe cover mounted on the distal end of the tympanic thermometer with portions broken away showing internal detail.

As shown in FIG. 9, the infrared signal IRS is reflected multiple times between an inner surface of the film 56 and distal edge of the nozzle 100 until the signal reaches the detector opening 140. Once the signal is directed to the detector opening 140, the detector fiber 138 conducts the signal to the IR detector 132. The detection of the infrared signal by the IR detector 132 indicates that the probe 22 is received in the probe cover 32.

Figure 10:
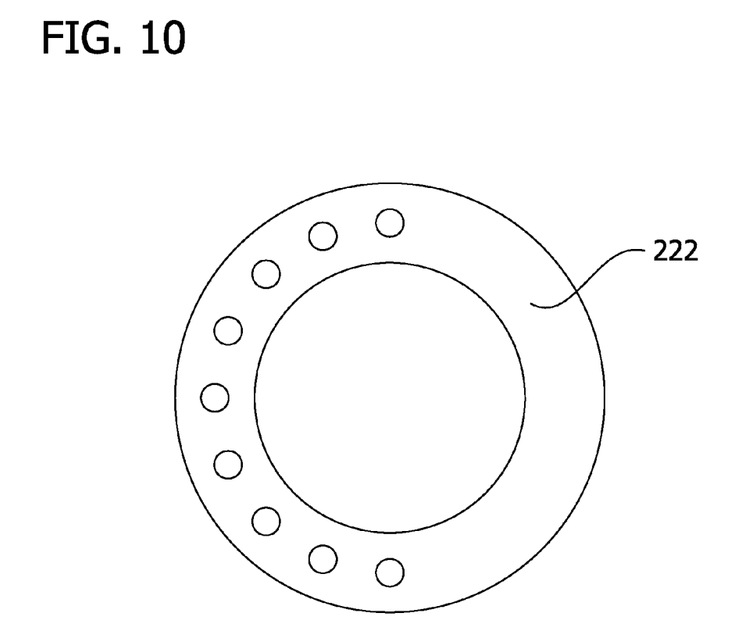
FIG. 10 is an end view of a second embodiment of a distal end of a probe of the tympanic thermometer.

In the illustrated embodiment, the emitter opening 136 and detector opening 140 are spaced about 90 degrees from each other to ensure that the infrared signal reaches the IR detector 132 without having to travel an extended distance. However, the openings 136, 140 can be spaced at other distances and angles from each other without departing from the scope of the invention. For instance, FIG. 10 shows a second embodiment of a probe 222 of the present invention having several options for possible emitter and detector openings. Also, the IR signal emitter 130 and IR signal detector 132 can be disposed at the distal end of the probe 22 near the emitter opening 136 and detector opening 140, respectively. In this embodiment, the emitter fiber 134 and detector fiber 138 may be omitted.

The temperature sensor 122, IR signal emitter 130, IR signal detector 132, constant current source 131, and signal conditioner 133 are operatively connected to a microprocessor system including a processor (not shown) of the controller. The processor is programmed to perform the temperature measurements for determining the temperature of the subject through the connection between the processor and the temperature sensor 122. The processor may also control the IR system for detecting the placement of the probe 22 as will be explained in greater detail below.

Figure 11:
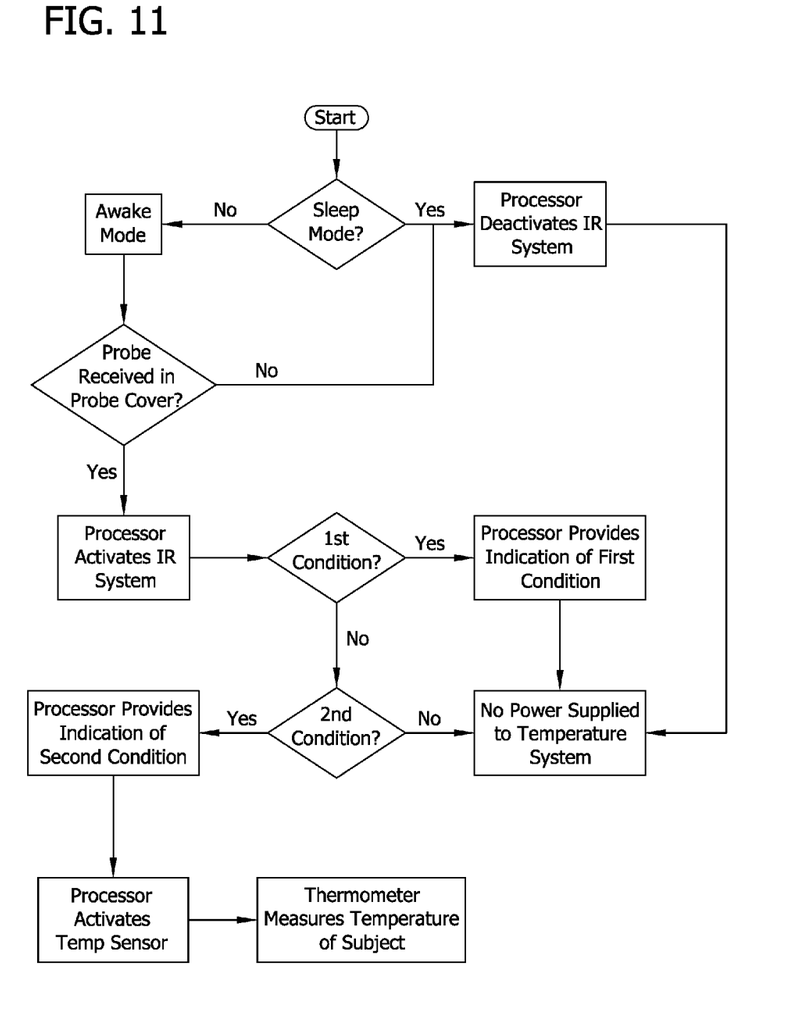
FIG. 11 is a flow chart showing a control sequence performed by a processor of the tympanic thermometer.

Referring to FIG. 11, the processor may control the IR system so that when the thermometer 20 is in the sleep mode, and when the thermometer is in the awake mode, but the probe 22 is not received in the probe cover 32, the processor will deactivate the IR system. In these two conditions, the processor may also be programmed to prevent power from being supplied to the temperature sensor 122. Thus, the thermometer 20 would not be capable of performing a temperature measurement. When the probe 22 is fully inserted into the probe cover 32, the probe cover engages a switch (not shown) on the probe and switches the thermometer 20 to the awake mode so that the processor may activate the IR system. Although the microprocessor of the thermometer is described as controlling both the temperature measurements and the IR system, a separate processor from the thermometer microprocessor may control the IR system.

When the IR system is activated, the processor can be programmed to identify a first condition wherein the infrared signal detected by the IR detector 132 indicates that the probe 22 is received in the probe cover 32 but not inserted into the subject, and a second condition wherein the infrared signal detected by the IR detector indicates that the probe is received in the probe cover and inserted into the subject. The processor can be programmed to provide an indication, such as a readout on a display 30 of the thermometer 20, notifying the practitioner which condition is being detected by the IR system. However, the indications can be provided in other ways such as audible indications without departing from the scope of the invention.

By way of example, when the processor identifies the first condition, the IR detector produces a voltage based on the received infrared energy; this voltage will be the reference voltage. When the processor identifies the second condition, the IR detector detects a voltage level shift from the reference voltage established during the first condition. The voltage ranges corresponding to the first and second conditions can have other values without departing from the scope of the invention.

The processor can also be programmed to activate the temperature sensor 122 to measure the temperature of the subject only after the processor identifies the second condition wherein the probe 22 is received in the probe cover 32 and inserted into the subject. This improves the accuracy of the thermometer 20 because power is not supplied to the temperature sensor 122 until the probe 22 is properly inserted into the subject. Also, external effects on the temperature sensor 122 are minimized making the temperature readings produced by the temperature sensor more accurate. Once the thermometer 20 acquires the subject's temperature, the processor may deactivate the IR system to conserve battery life and prevent the reuse of the probe cover.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electronic thermometer comprising:
  a probe adapted to be heated by a subject for use in measuring a temperature of the subject;
  at least one temperature sensor for detecting a temperature of the probe;
  an IR emitter for emitting an infrared signal from the probe;
  an IR detector for detecting the infrared signal emitted by the IR emitter, the detection of the IR signal by the IR detector indicating that the probe is received in a probe cover; and
  a processor operatively connected to the IR emitter and IR detector and programmed to monitor the infrared signal detected by the IR detector to determine a first condition wherein the infrared signal indicates that the probe is received in a probe cover and not inserted into the subject and a second condition wherein the infrared signal indicates that the probe is received in a probe cover and inserted into the subject;
  wherein the IR detector records a voltage proportional to the infrared signal detected by the IR detector, the processor identifying the first and second conditions by the voltage recorded by the IR detector.

2. An electronic thermometer as set forth in claim 1 wherein the processor is operatively connected to the at least one temperature sensor and programmed to activate the at least one temperature sensor to measure the temperature of the subject only after the processor identifies the second condition wherein the IR detector detects an infrared signal within a predetermined range indicating that the probe is received in a probe cover and inserted into the subject.

3. An electronic thermometer as set forth in claim 2 wherein the processor is programmed to temporarily deactivate the at least one temperature sensor and either the IR emitter or the IR detector or both after the temperature of the subject is measured to prevent reuse of the probe cover.

4. An electronic thermometer as set forth in claim 1 wherein the IR detector detects a reference indicating the first condition when the probe is received in a probe cover and not inserted into the subject.

5. An electronic thermometer as set forth in claim 4 wherein the IR detector detects a shift from the reference voltage indicating the second condition when the probe is received in a probe cover and inserted into the subject.

6. An electronic thermometer as set forth in claim 1 wherein the processor is programmed to provide a first indication when the processor identifies the first condition and a second indication different from the first indication when the processor identifies the second condition.

7. An electronic thermometer as set forth in claim 1 wherein the IR emitter and IR detector are disposed in a wall the probe.

8. An electronic thermometer as set forth in claim 7 further comprising an emitter opening and a detector opening each in a distal end of the probe, the emitter opening allowing the infrared signal emitted by the IR signal emitter to be directed out of a distal end of the probe, and the detector opening allowing the infrared signal to be directed to the IR signal detector.

9. An electronic thermometer as set forth in claim 8 wherein the IR emitter and IR detector are disposed at a proximal end of the probe.

10. An electronic thermometer as set forth in claim 9 further comprising an emitter fiber and a detector fiber each extending along a length of the probe from the proximal end of the probe to the distal end of the probe, the emitter fiber conducting the infrared signal emitted by the IR emitter to the distal end of the probe, the infrared signal being reflected by a film of the probe cover to the detector fiber which conducts the reflected signal to the IR detector disposed at the proximal end of the probe when the probe is received in the probe cover.

11. An electronic thermometer as set forth in claim 10 wherein the emitter fiber and detector fiber are both fiber optic strands for conducting the infrared signal.

12. An electronic thermometer as set forth in claim 10 wherein the infrared signal is reflected multiple times by an inner surface of the probe cover before being detected by the IR signal detector when the probe is received in the probe cover.

13. An electronic thermometer as set forth in claim 8 wherein the probe is generally tubular, the emitter opening being spaced circumferentially about 90 degrees from the detector opening.

14. An electronic thermometer as set forth in claim 8 wherein the IR emitter and IR detector are disposed at a distal end of the probe.

15. An electronic thermometer as set forth in claim 1 wherein the thermometer is a tympanic thermometer.

16. A method of determining a temperature of a subject with an electronic thermometer, said thermometer having a probe adapted to be heated by a subject and at least one temperature sensor for detecting a temperature of the probe, said method comprising:
emitting an IR signal out of the probe;
detecting the IR signal, the detection of the IR signal indicating that the probe is received in a probe cover;
enabling the temperature sensor to detect the temperature of the probe when the probe is received in the probe cover;
detecting a temperature of the probe when inserted into the subject by using the temperature sensor to determine the temperature of the subject;
monitoring the detected infrared signal to determine a first condition wherein the infrared signal indicates that the probe is received in a probe cover and not inserted into the subject and a second condition wherein the infrared signal indicates that the probe is received in a probe cover and inserted into the subject; and
recording a voltage proportional to the detected infrared signal and identifying the first and second conditions by the recorded voltage.

17. A method as set forth in claim 16 wherein the thermometer includes a processor operatively connected to the temperature sensor and programmed to activate the at least one temperature sensor only after the processor identifies the second condition wherein an IR detector detects the infrared signal within a predetermined range indicating that the probe is received in the probe cover and inserted into the subject.

18. A method as et forth in claim 17 further comprising programming the processor to deactivate the temperature sensor after the temperature of the subject is measured to prevent reuse of the probe cover.

19. A method as set forth in claim 16 further comprising providing a first indication when the first condition is identified and a second indication different from the first indication when the second condition is identified.

20. A method as set forth in claim 16 further comprising:
emitting the infrared signal out of an emitter opening in a distal end of the probe; and
directing the emitted infrared signal into a detector opening in the distal end of the probe for detection.

21. A method as set forth in claim 20 further comprising:
conducting the emitted infrared signal to the distal end of the probe with an emitter fiber extending along a length of the probe;
reflecting the infrared signal with a film of a probe cover to a detector fiber extending along a length of the probe; and
conducting the reflected infrared signal to a proximal end of the probe with the detector fiber for detection.

22. A method as set forth in claim 21 wherein the infrared signal is reflected multiple times by an inner surface of the film before being detected.

23. A method as set forth in claim 16 wherein the thermometer is a tympanic thermometer.

24. An electronic thermometer comprising:
a probe adapted to be heated by a subject for use in measuring a temperature of the subject, the probe having a wall;
at least one temperature sensor for detecting a temperature of the probe;
an IR emitter at a proximal end of the probe for emitting an infrared signal from the probe;
an IR detector at the proximal end of the probe for detecting the infrared signal emitted by the IR emitter, the detection of the IR signal by the IR detector indicating that the probe is received in a probe cover, the IR emitter and IR detector being disposed in the wall the probe;
an emitter opening and a detector opening each in a distal end of the probe, the emitter opening allowing the infrared signal emitted by the IR signal emitter to be directed out of a distal end of the probe, and the detector opening allowing the infrared signal to be directed to the IR signal detector; and
an emitter fiber and a detector fiber each extending along a length of the probe from the proximal end of the probe to the distal end of the probe, the emitter fiber conducting the infrared signal emitted by the IR emitter to the distal end of the probe, the infrared signal being reflected by a film of the probe cover to the detector fiber which conducts the reflected signal to the IR detector disposed at the proximal end of the probe when the probe is received in the probe cover, the infrared signal being reflected multiple times by an inner surface of the probe cover before being detected by the IR signal detector when the probe is received in the probe cover.

25. A method of determining a temperature of a subject with an electronic thermometer, said thermometer having a probe adapted to be heated by a subject and at least one temperature sensor for detecting a temperature of the probe, said method comprising:

emitting an IR signal out of the probe, including emitting the infrared signal out of an emitter opening in a distal end of the probe, directing the emitted infrared signal into a detector opening in the distal end of the probe for detection by conducting the emitted infrared signal to the distal end of the probe with an emitter fiber extending along a length of the probe;

reflecting the infrared signal with a film of a probe cover to a detector fiber extending along a length of the probe; and conducting the reflected infrared signal to a proximal end of the probe with the detector fiber for detection, the infrared signal being reflected multiple times by an inner surface of the film before being detected;

detecting the IR signal, the detection of the IR signal indicating that the probe is received in a probe cover;

enabling the temperature sensor to detect the temperature of the probe when the probe is received in the probe cover;

detecting a temperature of the probe when inserted into the subject by using the temperature sensor to determine the temperature of the subject.

* * * * *